United States Patent Office 3,494,903
Patented Feb. 10, 1970

3,494,903
PROCESS FOR THE RECOVERY OF ETHYLENE POLYMERS
Rajindar K. Kochhar, Overland Park, Kans., assignor to Gulf Research & Development Company, Pittsburgh, Pa., a corporation of Delaware
No Drawing. Continuation-in-part of application Ser. No. 586,925, Oct. 17, 1966. This application Aug. 2, 1967, Ser. No. 657,759
Int. Cl. C08f 1/92
U.S. Cl. 260—86.7
4 Claims

ABSTRACT OF THE DISCLOSURE

Self-emulsifiable, water-insoluble ethylene polymer containing pendent carboxylate groups are recovered from aqueous dispersions of such polymers by contacting such ethylene polymer dispersions with an ammonium salt.

CROSS REFERENCES TO RELATED APPLICATIONS

This application is a continuation-in-part of application Ser. No. 586,925, filed Oct. 17, 1966, which describes the recovery of self-emulsifiable ethylene polymers from aqueous dispersions of such polymers by contacting such aqueous dispersions with an alkali metal salt of an organic or inorganic acid at an elevated temperature.

Copending application Ser. No. 131,108, filed Aug. 14, 1961, by Jack Hurst and Harry D. Anspon, now U.S. Patent 3,337,517, describes the preparation of aqueous dispersions of water-insoluble, self-emulsifiable ethylene polymers containing pendent carboxylate groups which can be suitably employed in the process of this invention. As described therein, water-insoluble, but self-emulsifiable ethylene polymers containing pendent carboxylate groups are prepared by the hydrolysis in an aqueous medium of the acrylate groups of a thermoplastic ethylene-alkyl acrylate interpolymer employing elevated temperatures, a metallic base, and, optionally, a nitrogenous base to produce a stable aqueous dispersion of the ethylene polymer. Reference is made to application Ser. No. 131,108, now U.S. Patent 3,337,517, for complete descriptions of the methods of preparing aqueous polymeric dispersions applicable in the hereinafter described invention.

BACKGROUND OF THE INVENTION

This invention relates to an improved process for the recovery of ethylene polymer solids from stable aqueous dispersions of such solids. In another aspect, this invention relates to a coagulation process for the recovery of self-emulsifiable, water-insoluble ethylene polymers containing pendent carboxylate groups from stable aqueous dispersions of such ethylene polymers.

In the preparation of water-insoluble, self-emulsifiable ethylene-alkyl acrylate polymers, a suitable process comprises hydrolyzing in the presence of water an ethylene-alkyl acrylate thermoplastic polymer, utilizing an alkali metal hydroxide and, optionally, a nitrogenous base to produce a stable aqueous dispersion of the ethylene polymer. The hydrolysis reaction produces a polymer wherein at least a self-emulsifiable portion of the acrylate groups are in hydrophilic form. Heretofore, the self-emulsifiable polymeric solids have been recovered from the dispersions by coagulation with water-miscible non-solvents such as acetone or by employing inorganic salts of polyvalent cations to coagulate the dispersed solids. Obviously, the use of acetone on a commercial process in necessarily large quantities with attendant acetone process losses in the separation of the polymer solids therefrom is not economically feasible.

The polymer product recovered from a self-emulsifiable ethylene polymer dispersion using a salt containing polyvalent ions as the coagulating or precipitating agent is of significantly different composition than the composition of the polymer solids in the dispersion and has radically different properties such as, for example, low melt flow and poor processability. Moreover, the coagulated solids obtained with the use of polyvalent ions are also incapable of being redispersed in water.

Accordingly, an object of my invention is to provide an improved process for the recovery of the water-insoluble, self-emulsifiable ethylene polymers from stable aqueous dispersions of such polymers.

Another object of my invention is to provide an improved process for the recovery of water-insoluble, but self-emulsifiable ethylene polymers containing pendent carboxylate groups from stable aqueous dispersions of such polymers.

Other objects, advantages and features of my invention will be readily apparent to those skilled in the art from the following description and the appendent claims.

SUMMARY OF THE INVENTION

By the invention, water-insoluble, but self-emulsifiable polymer solids containing pendent carboxylate salt groups are recovered from stable aqueous dispersions of such solids by contacting the aqueous dispersions with an aqueous dispersion of an ammonium salt and recovering therefrom the ethylene polymer solids in coagulated form. Preferably the coagulation step is conducted at temperatures above 50° C. The coagulated or precipitated ethylene polymer solids are readily separated from the aqueous medium by conventional filtration means or the like.

The recovered ethylene polymers have high tensile strengths (both yield and break) and high elongation values which are critical in such application areas as the preparation of safety glass laminates. Employment of the inventive polymer coagulation process substantially reduces the amount of water washing normally required with conventional acid precipitation processes and substanttially eliminates the tendency observed in the acid coagulation process to cause the formation of polymer crosslinks. As heretofore noted the inventive process is substantially superior to acetone coagulation processes in that acetone losses are high and the acetone coagulation step is highly difficult to control.

DESCRIPTION OF THE INVENTION

The invention is directed to the recovery of ethylene polymer solids wherein the self-emulsilable ethylene polymer contains pendent carboxylate salt groups. Although not to be limited thereto, the invention has been found to be particularly applicable to the separation and recovery of the ethylene-alkyl acrylate polymer solids wherein a self-emulsifiable portion of the acrylate groups are in alkali metal salt form. Such aqueous dispersions as heretofore noted can be prepared by the hydrolysis of a thermoplastic ethylene-alkyl acrylate polymer in an aqueous medium utilizing an alkali metal hydroxide and, optionally, a nitrogenous base to hydrolyze a portion or all of the acrylate groups to the carboxylate salt and, optionally, acid and/or amide form. The ethylene-alkyl acrylate polymers which can be hydrolyzed to provide aqueous dispersions of water-insoluble, self-emulsifiable ethylene-alkyl acrylate polymers can be those polymers described by George E. Ham, Harry D. Anspon and William H. Byler in copending application Ser. No. 335,732 filed Jan. 6, 1964, now U.S. Patent 3,350,372. The ethylene-alkyl acrylate polymers so prepared can be hydrolyzed by the proces described in copending application Ser. No. 131,108, now U.S. Patent 3,337,517. As described therein an ethylene-alkyl acrylate copolymer is hydrolyzed to form a water-insoluble, self-emulsified ethylene polymer wherein at least a portion of the acrylate groups are in carboxylate salt form. By contacting at an elevated temperature the thermoplastic polymer in an aqueous medium with an alkaline metallic base and, optionally, a nitrogenous base, the product of the hydrolysis reaction comprises a water-insoluble, but self-emulsifiable ethylene polymer dispersed throughout the aqueous medium.

"Water-insoluble" as used herein refers to the inability of the fused solid ethylene polymer to become dissolved in water as measured, for example, by preparing a one-half mil cast film of the product polymer, placing a 10 x 10 centimeter sample in one liter of water maintained at a temperature of 30° C. for a period of 24 hours, removing the film from the water, drying the film to a constant weight at 120° C., and determining that the weight loss in the film when compared to the weight of the original film sample shall be less than 10 weight percent. "Self-emulsifiable" as used herein refers to that property of the polymer whereby one gram of the polymer in particulate form can be readily dispersed in 100 ml. of water in a stirred metal autoclave maintained at a temperature in the range of 180 to 300° C. to provide, in the absence of an emulsifying agent, a shelf-stable dispersion wherein the average particle size is two microns or less.

The inventive process is applicable to the recovery of self-emulsifiable ethylene polymer solids containing pendent carboxylate salt groups from stable dispersions of such solids wherein the concentration of carboxylate salt groups in the ethylene polymer is sufficient for self-emulsification. The inventive process is also applicable to the recovery of ethylene polymer solids from dispersions of such solids wherein the dispersed polymer in addition contains pendent amide, acid or ester groups.

Those ethylene polymers which are considered to be particularly applicable in the process of my invention are those ethylene-alkyl acrylate polymers wherein the alkyl acrylate concentration is in the range of about 0.01 to about 0.5 (preferably, 0.025 to about 0.25) mol of acrylate groups per mol of contained ethylene groups. The water-insoluble, but self-emulsifiable ethylene-alkyl acrylate polymers are selected from the groups consisting of:

(1) Polymers containing 67–99 (preferably 87–95.2) mol percent of units (a) and, correspondingly, 33–1 (preferably 13.0–4.8) mol percent of units (b), (2) Polymers containing 67–99 (preferably 87–95.2) mol percent of units (a) and, correspondingly, 33–1 (preferably 13.0–4.8) mol percent of a mixture of units (b) and (c), (3) Polymers containing 67–99 (preferably 87–95.2) mol percent of units (a), and, correspondingly, 33–1 (preferably 13.0–4.8) mol percent of a mixture of units (b), (c) and (d), (4) Polymers containing 67–99 (preferably 87–95.2) mol percent of units (a) and, correspondingly, 33–1 (preferably 13.0–4.8) mol percent of a mixture of units (b), (c), (d) and (e), (5) Polymers containing 67–99 (preferably 87–95.2) mol percent of units (a) and, correspondingly, 33–1 (preferably 13.0–4.8) mol percent of a mixture of units (b) and (d), (6) Polymers containing 67–99 (preferably 87–95.2) mol percent of units (a) and, correspondingly, 33–1 (preferably 13.0–4.8) mol percent of a mixture of units (b) and (e), (7) Polymers containing 67–99 (preferably 87–95.2) mol percent of units (a) and, correspondingly, 33–1 (preferably 13.0–4.8) mol percent of a mixture of units (b), (c) and (e), (8) Polymers containing 67–99 (preferably 87–95.2) mol percent of units (a) and, correspondingly, 33–1 (preferably 13.0–4.8) mol percent of a mixture of units (b), (d) and (e), and (9) Mixtures of (1), (2), (3), (4), (5), (6), (7) and (8), said units (a) having the structure $$-CH_2-CH_2-$$

said units (b) having the structure

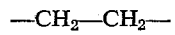

said units (c) having the structure

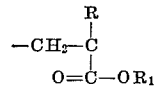

said units (d) having the structure

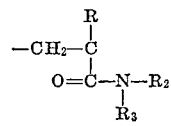

said units (e) having the structure

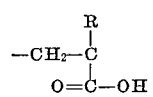

where R is selected from the group consisting of hydrogen and methyl, $R_1$ is selected from the group consisting of alkali metals, hydrogen, ammonium ion, silver, magnesium, zinc, cadmium, iron, cobalt, copper, calcium, aluminum, barium, titanium, tin, lead, chromium, quaternary ammonium ion, and amine complexes with the above metals, $R_2$ and $R_3$ are independently selected from the group consisting of hydrogen, methyl, ethyl, propyl, butyl, hydroxyethyl, morpholine and heterocyclic groups containing up to 22 carbon atoms, and $R_4$ is selected from allyl and alkyl groups containing up to 22 carbon atoms.

Coagulation or precipitation of the ethylene polymer solids contained in the aqueous dispersion is effected by contacting the aqueous dispersion with an ammonium salt. The precipitating agent can be a solid or an aqueous solution of the salt. Although not to be limited thereto, it has been observed that rapid coagulation and precipitation of the polymer solids is effected when the weight of the salt employed is at least 50 weight percent of the polymer solids contained in the dispersion. It will readily be understood by those skilled in the art that the quantity of ammonium salt employed will vary with the particular salt utilized and the rate of coagulation or precipitation desired. By increasing the quantity of ammonium salt utilized in the coagulation or precipitation process, the rate of coagulation is normally increased. Although not to be limited thereto, preferred ammonium salts include ammonium chloride, ammonium carbonate, ammonium bicarbonate, ammonium oxylate, ammonium sulfate, and ammonium acetate.

For ease in handling the coagulated polymer solids and effecting separation of the coagulated polymer solids from the aqueous medium, it is preferred that the concentration of polymer in the aqueous dispersion not exceed about 40 weight percent. For the most efficient separation of polymer solids, the Brookfield viscosity of the dispersion should preferably be below 2000 cps. at room temperature.

Preferably, the coagulation step is conducted at an elevated temperature. In conducting the coagulation step at an elevated temperature the concentration of water in the recovered polymer is substantially reduced. A coagulation temperature in the range of 50° C. to 95° C. is preferred.

The coagulated or precipitated solids produced by the process of this invention are readily redispersed in an aqueous medium by the utilization of an elevated temperature, an alkali metal hydroxide and/or a nitrogenous base such as ammonium hydroxide.

The following examples are presented as illustrative of the objects and advantages of the invention. However, it is not intended that the invention should be limited to the specific embodiments presented therein.

EXAMPLE I

In each of the following Examples I–IV, ethylene polymer solids are precipitated from an aqueous dispersion of said solids by the addition thereto of ammonium salt precipitating agents or a mineral acid precipitating agent as hereafter described. The ethylene polymer aqueous dispersion is prepared by the potassium hydroxide hydrolysis of an ethylene-methyl acrylate copolymer to produce a water-insoluble, but self-emulsifiable ethylene polymer containing pendent potassium salt groups. The prepared aqueous dispersion contains 13.4 weight percent solids, has a pH of 12.6 and contains no pendent ester groups. Analysis of the ethylene polymer indicates that the concentration of potassium is 8.29 weight percent.

In each of Runs 1 and 2 of this Example, the aqueous polymer dispersion is diluted to prepare a dispersion containing 4.5 weight percent polymer solids and ammonium chloride is added to the diluted solution at or near room temperature. The resultant mixture is heated to a temperature of 70 to 80° C. in preparation of the coagulated or precipitated solids. In Run 1 the weight of ammonium chloride added is equal to the weight of the polymer solids and in Run 2 the weight of ammonium chloride added exceeds the weight of the polymer solids by 50 weight percent. The coagulated polymer solids are separated by filtration from the aqueous medium, washed and air dried. Analysis of the product polymers indicates that essentially all of the pendent potassium salt groups are converted to the acid form. Product analysis results are presented below in Table I.

TABLE

| Runs | Wt. percent Yield | Melt index,[1] grams per 10 minutes | Tensile[2] strength, p.s.i. | | Percent Break elongation[2] |
|---|---|---|---|---|---|
| | | | Yield | Break | |
| 1 | 88.0 | 0.347 | 1,400 | 5,746 | 403 |
| 2 | 88.9 | 0.387 | 1,123 | 5,649 | 427 |

[1] ASTM D1238–65T; FR–D.
[2] ASTM D638 64T.

From the above it is readily apparent that ammonium chloride is highly effective in recovering ethylene polymer solids from aqueous dispersion of said solids, wherein the ethylene polymer contains pendent potassium salt groups, to obtain coagulated ethylene polymer solids having high relative tensile strengths and percent elongation.

EXAMPLE II

The aqueous ethylene polymer dispersion of Example I is diluted to obtain an aqueous dispersion containing 5.0 weight percent polymer solids. To this diluted dispersion is added ammonium bicarbonate in an amount equivalent to the weight of polymer solids in the aqueous dispersion and the mixture heated to a temperature in the range of 70 to 80° C. The resultant coagulated polymer solids are separated from the aqueous medium by filtration, washed and air dried. 89.1 weight percent of the polymer solids are recovered from the aqueous medium. The melt index of the polymer as determined by the test method of Example I is 0.181. The tensile yield and the tensile break strengths of the recovered polymer determined by the test method of Example I are 1449 and 5459 p.s.i., respectively. The percent elongation as determined by the test method of Example I is 385.

EXAMPLE III

The aqueous ethylene polymer dispersion of Example I is diluted with water to obtain an aqueous dispersion containing 4.5 weight percent polymer solids. To this diluted dispersion is added ammonium carbonate in an amount equivalent to 150 weight percent of the polymer solids in the aqueous dispersion. The resultant admixture is heated to a temperature in the range of 70 to 80° C. and the coagulated polymer solids separated from the aqueous medium by filtration. The coagulated solids are washed with water and air dried. 88.0 weight percent of the polymer solids are recovered from the aqueous medium. The melt index of the recovered polymer as determined by the test method of Example I is 0.212. The tensile yield and the tensile break strengths of the recovered polymer as determined by the test methods of Example I are 1072 and 5173 p.s.i., respectively. The percent elongation as determined by the test method of Example I is 377.

EXAMPLE IV

To the aqueous ethylene polymer dispersion of Example I is added sulfuric acid in an amount sufficient to recover 86.6 weight percent of the polymer solids. As in the case of Examples I–III, the resultant coagulated polymer solids are separated from the aqeuous medium by filtration, washed and air dried. The melt index of the polymer as determined by the test method of Example I is 0.317. The tensile yield and the tensile break strengths of the recovered polymer as determined by the test methods of Example I are 797 and 4387 p.s.i., respectively. The percent elongation as determined by the test method of Example I is 376.

A comparison of the tensile strength properties of the polymer recovered by the acid coagulation process of this example with the tensile strength properties of the polymer recovered by the process of Examples I–III clearly demonstrate the effectiveness of the invention to produce a polymer product having substantially higher tensile yield and break strengths.

EXAMPLE V

In each of the following examples V–VII, an ethylene polymer is precipitated from an aqueous dispersion of said polymer by the addition thereto of ammonium salt precipitating agents or acetone as hereinafter described. The ethylene polymer aqueous dispersion is prepared by the sodium hydroxide hydrolysis of an ethylenemethyl acrylate copolymer to produce a water-insoluble, but self-emulsifiable ethylene polymer containing pendent sodium salt groups. The prepared aqueous dispersion contains 23.0 weight percent solids, has an acid equivalent/ 100 g. of 0.032, and contains 2.60 weight percent sodium.

In this example the aqueous polymer dispersion is diluted to prepare an aqueous dispersion containing 6.01 weight percent polymer solids and ammonium sulfate is added to the diluted solution, the weight of ammonium sulfate added being equal to 50 weight percent of the polymer solids. The resultant mixture is heated to a temperature of 70 to 80° C. The coagulated polymer solids are separated by filtration from the aqueous medium, washed and air dried. 99.2 weight percent of the polymer solid are recovered from the aqueous medium. The melt index of the recovered polymer as determined by the test method of Example I is 0.230. The tensile yield and the tensile break strengths of the recovered polymer as determined by the test methods of Example I are 1209 and 5149 p.s.i., respectively. The percent elongation as determined by the test method of Example I is 400.

EXAMPLE VI

To the diluted aqueous dispersion of Example V is added ammonium acetate in an amount equivalent to the weight of polymer solids in the diluted aqueous dispersion and the mixture heated to a temperature in the range of 70 to 80° C. The resultant coagulated polymer solids are separated from the aqueous medium by filtration, washed and air dried. 95.6 weight percent of the polymer solids are recovered from the aqueous medium. The melt index of the polymer as determined by the test method of Example I is 0.112. The tensile strength and the tensile break strengths of the recovered polymer as determined by the test methods of Example I are 1553 and 4720 p.s.i. respectively. The percent elongation as determined by the test method of Example I is 332.

EXAMPLE VII

To the diluted aqueous ethylene polymer dispersion of Examples V and VI is added acetone equivalent to twice the volume of the aqueous dispersion. Precipitation of the dispersed polymer is effected at room temperature and the coagulated solids recovered, washed and air dried as in Examples I–VI. The recovered polymer will not flow at the temperature employed in the measurement of the melt indices of the recovered polymers of Examples I–VI. The tensile yield and the tensile break strengths of the recovered polymer as determined by the test methods of Example I are 1415 and 4869 p.s.i., respectively. The percent elongation as determined by the test method of Example I is 284. The percent elongation is significantly lower than that obtained in Examples V and VI.

The polymer solids recovered by the process of this invention can be extruded and molded by conventional techniques. Films of the extruded polymer have gained wide acceptance in the packaging field. The recovered polymer solids have also gained acceptance in the preparation of laminated structures such as automotive safety glass, forming the inner layer.

Various modifications of the invention can be made within the skill of the art from the above disclosure and the appendant claims.

I claim:

1. A process which comprises contacting an aqueous dispersion of a water-insoluble, self-emulsifiable ethylene polymer containing pendant carboxylate salt groups with an ammonium salt, said ethylene polymer comprising an ethyelne-alkyl acrylate copolymer wherein the alkyl acrylate concentration is in the range of about 0.01 to about 0.5 mol of acrylate groups per mol of contained ethylene groups and wherein said water-insoluble, self-emulsifiable ethylene-alkyl acrylate polymers are selected from the groups consisting of:
 (1) Polymers containing 67–99 mol percent of units (a) and, correspondingly, 33–1 mol percent of units (b),
 (2) Polymers containing 67–99 mol percent of units (a) and, correspondingly, 33–1 mol percent of a mixture of units (b) and (c),
 (3) Polymers containing 67–99 mol percent of units (a) and, correspondingly, 33–1 mol percent of a mixture of units (b), (c) and (d),
 (4) Polymers containing 67–99 mol percent of units (a) and, correspondingly, 33–1 mol percent of a mixture of units (b), (c), (d) and (e),
 (5) Polymers containing 67–99 mol percent of units (a) and, correspondingly, 33–1 mol percent of a mixtures of units (b) and (d),
 (6) Polymers containing 67–99 mol percent of units (a) and, correspondingly, 33–1 mol percent of a mixture of units (b) and (e),
 (7) Polymers containing 67–99 mol percent of units (a) and, correspondingly, 33–1 mol percent of a mixture of units (b), (c) and (e),
 (8) Polymers containing 67–99 mol percent of units (a) and, correspondingly, 33–1 mol percent of a mixture of units (b), (d) and (e), and
 (9) Mixtures of (1), (2), (3), (4), (5), (6), (7) and (8), said units (a) having the structure

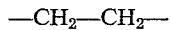

said units (b) having the structure

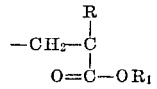

said units (c) having the structure

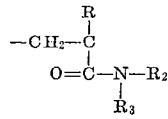

said units (d) having the structure

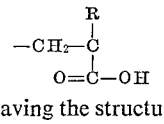

said units, (e) having the structure

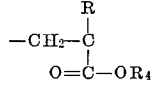

where R is selected from the group consisting of hydrogen and methyl, $R_1$ is selected from the group consisting of the alkali metals, ammonium ion, silver, magnesium, zinc, cadmium, iron, cobalt, copper, calcium, aluminum, barium, titanium, tin, lead, chromium, quaternary ammonium ion, and amine complexes with the above metals, $R_2$ and $R_3$ are independently selected from the group consisting of hydrogen, methyl, ethyl, propyl, butyl, hydroxyethyl, morpholine and heterocyclic groups containing up to 22 carbon atoms, and $R_4$ is selected from allyl and alkyl groups containing up to 22 carbon atoms,
maintaining a contacting temperature of at least 50° C., the weight of said ammonium salt introduced into said aqueous medium comprising at least 50 weight percent of the polymer solids contained in said dispersion, maintaining the resulting admixture at the elevated temperature for the time required to effect complete coagulation, and recovering therefrom coagulated polymer solids substantially free of cations.

2. The process of claim 1 wherein said carboxylate salt is an alkali metal salt.

3. The process of claim 1 wherein the Brookfield viscosity of said aqueous dispersion is below 2000 cps. at room temperature.

4. The process of claim 1 wherein said ammonium salt is selected from the group consisting of ammonium chloride, ammonium carbonate, ammonium bicarbonate, ammonium oxalate, ammonium sulfate, and ammonium acetate.

References Cited

UNITED STATES PATENTS

| | | | |
|---|---|---|---|
| 2,475,053 | 7/1949 | Rumbold | 260—83.3 |
| 3,115,484 | 12/1963 | Scriba | 260—83.3 |
| 3,337,517 | 8/1967 | Anspon | 260—86.7 |
| 3,350,372 | 10/1967 | Anspon et al. | 260—86.7 |

JOSEPH L. SCHOFER, Primary Examiner

J. C. HAIGHT, Assistant Examiner

U.S. Cl. X.R.

260—80.73, 80.8, 80.81, 86.1, 96